C. V. Mead,
Wringer Roll,

Nº 61,677.   Patented Jan. 29, 1867.

Witnesses:
Thos Trusch
J. A. Serviss

Inventor:
Chas V Mead
Per Munn & Co
Attorneys.

United States Patent Office.

CHARLES V. MEAD, OF HAMILTON, NEW JERSEY.

Letters Patent No. 61,677, dated January 29, 1867.

IMPROVED ROLLER FOR WRINGERS.

*The Schedule referred to in these Letters Patent and making part of the same.*

TO ALL WHOM IT MAY CONCERN:

Be it known that I, CHARLES V. MEAD, of Hamilton, in the county of Mercer, and State of New Jersey, have invented a new and useful improvement in India-Rubber Rollers; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a roller, the shaft of which is made in two or more sections, which are clamped together by wrapping through and round them cloth, wire, or other suitable material, to which the rubber will readily adhere, in such a manner that a roller is obtained which is not liable to work loose from or turn on its shaft.

Figure 1:
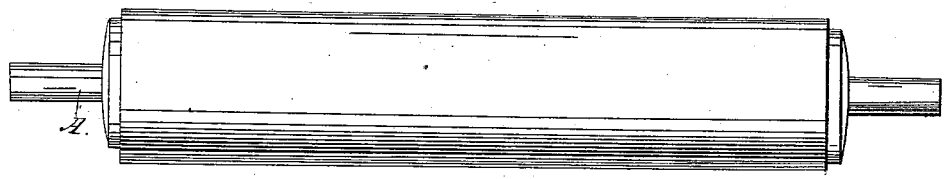
Figure 1 represents a side elevation of this invention.
Figure 2:
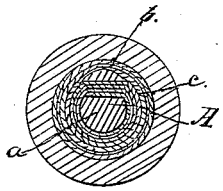
Figure 2 is a transverse section of the same.

A represents the shaft of my improved roller, which is made in two sections, $a\ b$, as clearly shown in fig. 2 of the drawing. These two sections are united by wrapping round and through them a quantity, $c$, of cloth, wire, or other suitable material, to which the India rubber will readily adhere. After the core, composed of the two sections of the shaft and of the wrapping $c$, has attained the desired thickness, I wrap round the same sheets of rubber or other vulcanizable gum until the roller has attained the desired thickness, and cure or vulcanize in the ordinary manner. By these means a roller for clothes-wringers, washing machines, or other purposes, is obtained which is cheap, and not liable to turn or work loose from its shaft.

What I claim as new, and desire to secure by Letters Patent, is—

The roller, consisting of the two sections $a\ b$, with material, $c$, between and completely surrounding them, and encased by the elastic covering, when constructed as herein shown and described.

The above specification of my invention signed by me this 27th day of September, 1866.

C. V. MEAD.

Witnesses:
WM. F. McNAMARA,
W. HAUFF.